US012734900B2

(12) United States Patent
Fortuna Araújo et al.

(10) Patent No.: US 12,734,900 B2
(45) Date of Patent: Sep. 15, 2026

(54) ELECTRONIC CONTROL CIRCUIT FOR ELECTRIC REGENERATIVE POWER TAKE-OFF AND OPERATION METHOD THEREOF

(71) Applicant: ADDVOLT, S.A., Matosinhos (PT)

(72) Inventors: José Pedro Fortuna Araújo, Matosinhos (PT); Luís Filipe Costa Luís Cardoso Encerrabodes, Matosinhos (PT); Ricardo Abílio Leite Falcão Correia Gonçalves, Matosinhos (PT); Leonel Rocha Araújo, Matosinhos (PT); Bruno Filipe Azevedo Costa, Matosinhos (PT); José Ricardo Sousa Silva Soares, Matosinhos (PT); Rodrigo Manuel Marinho Pires, Matosinhos (PT); Justino Miguel De Neto Sousa, Matosinhos (PT)

(73) Assignee: ADDVOLT, S.A., Matosinhos (PT)

( * ) Notice: Subject to any disclaimer, the term of this patent is extended or adjusted under 35 U.S.C. 154(b) by 223 days.

(21) Appl. No.: 18/832,848

(22) PCT Filed: Jan. 24, 2023

(86) PCT No.: PCT/IB2023/050592
§ 371 (c)(1),
(2) Date: Jul. 24, 2024

(87) PCT Pub. No.: WO2023/139566
PCT Pub. Date: Jul. 27, 2023

(65) Prior Publication Data

US 2025/0091446 A1 Mar. 20, 2025

(30) Foreign Application Priority Data

Jan. 24, 2022 (PT) ........................................ 117754

(51) Int. Cl.
*H02P 1/46* (2006.01)
*B60L 15/02* (2006.01)
*B60L 15/20* (2006.01)

(52) U.S. Cl.
CPC ......... *B60L 15/025* (2013.01); *B60L 15/2072* (2013.01); *B60L 2240/427* (2013.01); *B60L 2240/429* (2013.01); *B60L 2240/52* (2013.01)

(58) Field of Classification Search
CPC ............... B60L 15/025; B60L 15/2072; B60L 2240/427; H02P 1/46; H02P 6/14
See application file for complete search history.

(56) References Cited

U.S. PATENT DOCUMENTS

| | | | |
|---|---|---|---|
| 5,552,681 A | 9/1996 | Suzuki et al. |
| 10,374,527 B2 | 8/2019 | Hessler et al. |

(Continued)

FOREIGN PATENT DOCUMENTS

| | | |
|---|---|---|
| EP | 0846065 A1 | 6/1998 |
| EP | 3213958 A1 | 9/2017 |
| WO | 2012112430 A2 | 8/2012 |

OTHER PUBLICATIONS

International Search Report for corresponding PCT Application No. PCT/IB2023/050592 dated May 1, 2023 (5 pages).

*Primary Examiner* — Cortez M Cook
(74) *Attorney, Agent, or Firm* — CANTOR COLBURN LLP

(57) ABSTRACT

A control circuit for electric regenerative power take-off includes: instant voltage and current sensors for connecting to power connection of a synchronous generator for capturing a triphasic voltage and a triphasic current, respectively; voltage-based and current-based direct-quadrature ("DQ") transform calculators outputting an equivalent two phase DQ tensor of a three vector triphasic voltage of the captured voltage and an equivalent two phase DQ tensor of a three (Continued)

vector triphasic current of the captured current, respectively; a current-based DQ controller outputting “desired” active-power and reactive-power voltages for the power controller; a phase-locked loop (“PLL”) for defining the operation angle of the power converter; a processor switching between $1^{st}$ and $2^{nd}$ operation stages in order to engage or disengage the power converter from the synchronous generator, and to synchronize the PLL with the captured voltage using “Q output” from either the voltage-based DQ transform calculator or the current-based DQ controller.

13 Claims, 3 Drawing Sheets

(56) References Cited

U.S. PATENT DOCUMENTS

| | | | | |
|---|---|---|---|---|
| 2002/0047683 | A1* | 4/2002 | Kawashima | H02P 6/14 318/721 |
| 2003/0052643 | A1 | 3/2003 | Sweo | |
| 2011/0181220 | A1* | 7/2011 | Tamai | H02P 1/46 318/400.33 |
| 2012/0206071 | A1 | 8/2012 | Keen et al. | |

* cited by examiner

PRIOR ART

ELECTRONIC CONTROL CIRCUIT FOR ELECTRIC REGENERATIVE POWER TAKE-OFF AND OPERATION METHOD THEREOF

CROSS-REFERENCE TO RELATED APPLICATIONS

This application is a U.S. National Stage Application under 35 U.S.C. § 371 of International Patent Application No. PCT/IB2023/050592, filed Jan. 24, 2023, which claims priority to Portugal Patent Application No. 117754, filed Jan. 24, 2022, the contents of which are each hereby incorporated by reference in their respective entireties.

TECHNICAL FIELD

The present disclosure relates to a system for dynamic electric regenerative power take-off from a vehicle traction shaft, in particular a wheel axle or a transmission shaft, and method thereof.

BACKGROUND

Systems for dynamic electric regenerative power take-off from a vehicle traction shaft, comprising a synchronous electrical generator for coupling the vehicle traction shaft and an electrical converter for converting the generated AC power into DC power, require controlling output voltage and current. In such a system, the generator requires a generator phase angle in synchronism with a converter state of said converter. The traction shaft can be a wheel axle or a transmission shaft. The traction shaft can be a transmission shaft of a vehicle propelled by an internal combustion engine or a wheel axle of a trailer vehicle being towed by a tractor vehicle.

If there is no synchronism between the electrical converter and the generator, there will be abnormal currents generated and the converter will go into a protection mode and switch off. It is thus required that the vector control state of the converter matches the rotation state of the generator.

As a system for regenerative power take-off does not control the state of the generator (which is coupled to a traction shaft of the vehicle), the initial phase angle and frequency of the generator is not known, unless sensors are used for detecting the angle and speed of the axle of the generator. These sensors can be for example magnetic or optical but require added costs, maintenance and complexity. These sensors are required to be installed at the generator axle, subject to mechanical and environmental factors such as heat, dust, humidity, among other factors.

Furthermore, in a vehicle propelled by an internal combustion engine or for a trailer vehicle being towed by a tractor vehicle, a regenerative system is not engaged when the vehicle is started or the vehicle moves after a stop. The regenerative system is only engaged after a minimum speed has been reached. When a minimum speed is reached, the system engages and the synchronism between generator phase angle and converter state needs to be in place.

Furthermore, braking systems like ABS or EBD will not normally tolerate a regenerative system being engaged during braking for safety reasons. Thus, when braking, the regenerative system will be instantly disengaged. When braking finishes, the system will again need to ensure synchronism between generator phase angle and converter state.

There is thus a need for an efficient cost-effective practical regenerative power system, and operation method thereof, that is able to detect the angle and speed of the axle of the generator of such systems that could dispense with angle and speed sensors installed at the generator axle.

Document EP0846065 A1 discloses a drive system, in particular a drive system for a motor vehicle, with a drive unit, in particular an internal-combustion engine; at least one electrical machine; and a traction-control unit. The electrical machine is designed so that drive-induced slip can be reduced, in particular by brake action and/or, when the electrical machine acts as a clutch, by slipping the clutch.

Document U.S. Pat. No. 5,552,681 discloses a braking and auxiliary driving unit for an internal combustion engine which produces braking and auxiliary motive power by converting electrical energy in both directions between a polyphase AC circuit of a squirrel-cage polyphase induction machine linked to the rotary shaft of the internal combustion engine and the DC circuit of an electricity storage means, the electricity storage means comprises an electrostatic capacitive circuit. A low-voltage storage battery is provided in addition to this electrostatic capacitive circuit, and this can be coupled to the electrostatic capacitive circuit by a bidirectional DC-to-DC converter.

These facts are disclosed in order to illustrate the technical problem addressed by the present disclosure.

GENERAL DESCRIPTION

The present disclosure relates to an inverter voltage synchronisation mechanism for synchronous motors, which eliminates the need for an encoder to find the motor position and speed; and method thereof.

The present disclosure relates to a system for dynamic electric regenerative power take-off from a vehicle traction shaft, in particular a wheel axle or a transmission shaft, for a vehicle propelled by an internal combustion engine or for a trailer vehicle being towed by a tractor vehicle, comprising a synchronous electrical generator for coupling the vehicle traction shaft and an electrical converter for converting the generated AC power into DC power and controlling output voltage and current, and an operation method thereof, in particular for synchronizing a generator phase angle with a converter state of said system.

Throughout the disclosure, the words motor and generator can be used interchangeably, as for synchronisation purposes no significant active power is being transitioned, making no difference if the machine is working as motor or generator—So, the words synchronous generator and motor can be used interchangeably as these devices are normally reversible.

For the course of the document the "d" axis will be considered the "active voltage/current" axis, and "q" the "reactive voltage/current" axis.

PLL's frequency output is an optional output for obtaining speed control.

An aspect of the present disclosure relates to an electronic control circuit for an electric regenerative power take-off device comprising a synchronous generator (synchronous motor), a power converter (inverter) and a power bus connecting the power converter to the generator, the circuit comprising:

- an instant voltage sensor for connecting to the power bus for capturing the synchronous generator triphasic voltage (V_motor);

- an instant current sensor for connecting to the power bus for capturing the synchronous generator triphasic current (I_motor);
- a voltage-based direct-quadrature, DQ, transform calculator arranged to output an equivalent two phase DQ-D and Q, tensor (Vd_motor, Vq_motor) of three voltage vectors of the captured triphasic voltage (V_motor);
- a current-based direct-quadrature, DQ, transform calculator arranged to output an equivalent two phase DQ-D and Q, tensor (Iq, Id) of three current vectors of the captured triphasic current (I_motor);
- a current-based direct-quadrature, DQ, controller (Id controller, Iq controller) for outputting setpoint active-power and reactive-power voltages (Vd, Vq) for the power converter from the outputted DQ tensor of the current-based DQ transform calculator;
- a phase-locked loop, PLL, for defining an operation angle of the power converter and comprising a phase input;
- an electronic data processor arranged to switch from a $1^{st}$ operation stage to a $2^{nd}$ operation stage, wherein
  - the $1^{st}$ stage comprises disengaging the power converter from the synchronous generator and synchronizing the PLL with the captured triphasic voltage by switching the PLL phase input to the voltage-based DQ transform calculator; and
  - the $2^{nd}$ stage comprises engaging the power converter from the synchronous generator and synchronizing the PLL with the captured triphasic voltage by switching the PLL phase input to the outputted DQ tensor output Q (Vq_motor) of the current-based DQ controller.

A controller used in the present disclosure can be any controller usual in the art, for example a PID controller, a PI controller, a Kalman filter, or the like. Generically, any controller able to control an output to minimize an error input is suitable to be used, with the usual constant/parameter setting as desired for the controller.

In an embodiment, the electronic data processor is configured for during the $1^{st}$ stage, to set an active-power setpoint voltage of the current-based DQ controller (Id Controller) equal to the outputted DQ tensor output D (Vd_motor) of the voltage-based DQ transform calculator, and to set a reactive-power setpoint voltage of the current-based DQ controller (Iq Controller) equal to zero.

An embodiment comprises a voltage-based direct-quadrature, DQ, inverse transform calculator arranged to output an instant converter-driving voltage (V_inverter) from the PLL-defined operation angle, and from the setpoint active-power and reactive-power voltages (Vd, Vq) of the current-based DQ controller (Id controller, Iq controller).

In an embodiment, the PLL is configured to output the operation angle to the current-based DQ transform calculator.

In an embodiment, the electronic data processor is configured to change from the $1^{st}$ stage to the $2^{nd}$ stage when the outputted DQ tensor output Q (Vq_motor) of the voltage-based DQ transform calculator is below a predetermined threshold.

In an embodiment, the electronic data processor is configured to engage or disengage the power converter from the synchronous generator by using power converter semiconductor switches for driving the synchronous generator voltage.

In an embodiment, the instant voltage sensor comprises an analogue-to-digital converter.

In an embodiment, the instant current sensor comprises an analogue-to-digital converter.

In an embodiment, the phase-locked loop, PLL, is a control system for generating an output signal whose phase is related to the phase of an input signal.

It is also disclosed an electric regenerative power take-off device comprising the electronic control circuit.

In an embodiment, the electric regenerative power take-off device comprises a synchronous generator (synchronous motor), a power converter (inverter) and a power bus connecting the power converter to the generator.

It is also disclosed a vehicle traction shaft, in particular a wheel axle or a transmission shaft, comprising the electric regenerative power take-off device.

It is also disclosed a method for operating an electronic control circuit for an electric regenerative power take-off device comprising a synchronous generator (synchronous motor), a power converter (inverter) and a power bus connecting the power converter to the generator, the circuit comprising:

- an instant voltage sensor for connecting to the power bus for capturing the synchronous generator triphasic voltage (V_motor);
- an instant current sensor for connecting to the power bus for capturing the synchronous generator triphasic current (I_motor);
- a phase-locked loop, PLL, for defining an operation angle of the power converter and comprising a phase input;
- an electronic data processor;

the method comprising using the electronic data processor for:

- calculating a voltage-based direct-quadrature, DQ, transform to output an equivalent two phase DQ-D and Q, tensor (Vd_motor, Vq_motor) from three voltage vectors of the captured triphasic voltage (V_motor);
- calculating a current-based direct-quadrature, DQ, transform calculator to output an equivalent two phase DQ-D and Q, tensor (Iq, Id) from three current vectors of the captured triphasic current (I_motor);
- using a current-based direct-quadrature, DQ, controller (Id controller, Iq controller) for outputting setpoint active-power and reactive-power voltages (Vd, Vq) for the power converter from the outputted DQ tensor of the current-based DQ transform calculator;
- switching from a $1^{st}$ operation stage to a $2^{nd}$ operation stage, wherein
  - the $1^{st}$ stage comprises disengaging the power converter from the synchronous generator and synchronizing the PLL with the captured triphasic voltage by switching the PLL phase input to the voltage-based DQ transform calculator; and
  - the $2^{nd}$ stage comprises engaging the power converter from the synchronous generator and synchronizing the PLL with the captured triphasic voltage by switching the PLL phase input to the outputted DQ tensor output Q (Vq_motor) of the current-based DQ controller.

An embodiment comprises non-transitory storage medium comprising computer program instructions for implementing an electronic control circuit for electric regenerative power take-off, the computer program instructions including instructions which, when executed by a processor, cause the processor to carry out the disclosed method.

BRIEF DESCRIPTION OF THE DRAWINGS

The following figures provide preferred embodiments for illustrating the disclosure and should not be seen as limiting the scope of invention.

DETAILED DESCRIPTION

The present disclosure relates to a system for dynamic electric regenerative power take-off from a vehicle traction shaft, in particular a wheel axle or a transmission shaft, for a vehicle propelled by an internal combustion engine or for a trailer vehicle being towed by a tractor vehicle, comprising a synchronous electrical generator for coupling the vehicle traction shaft and an electrical converter for converting the generated AC power into DC power and controlling output voltage and current, and an operation method thereof, in particular for synchronizing a generator phase angle with a converter state of said system.

The present disclosure relates to an inverter voltage synchronisation mechanism for synchronous motors, eliminating the need for an encoder to find the motor position and speed.

In an embodiment, synchronous motors have internal voltage proportional to its speed (commonly known as back EMF). This voltage can be measured at the terminals of the motor if no load is applied to it.

In an embodiment, if the motor is connected to an inverter, this voltage can only be read when the inverter is idle (not switching).

In an embodiment, for intermittent inverter operation (either tractioning or regenerating), this solution makes it possible for the inverter to connect to the motor at any point of the motor operation.

In an embodiment, sensorless operation of synchronous machines is wide-spread, as is the use of voltage syncing algorithms (specially for grid-synced operation).

The electronic control circuit described in the present disclosure bridges both and enables the seamless transition from one mode to the other, even when the motor is already spinning.

Figure 1A:
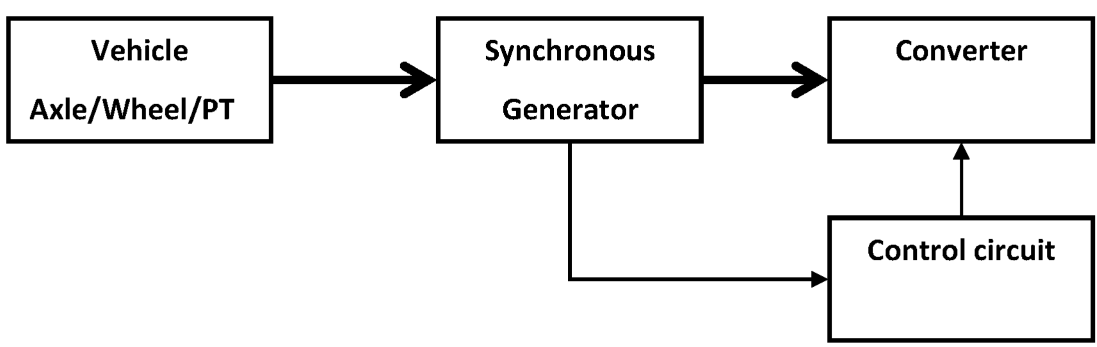
FIG. 1: Schematic representation of an embodiment of the system for dynamic electric regenerative power take-off comprising a synchronous generator (or motor, interchangeably), a power converter and electronic control circuit according to the prior art (1*a*) and according to the disclosure (1*b*).
Figure 1B:
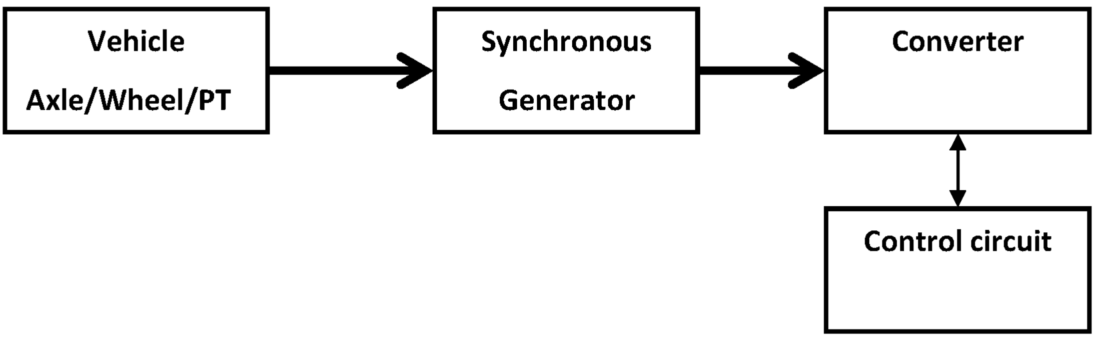
Figure 2:
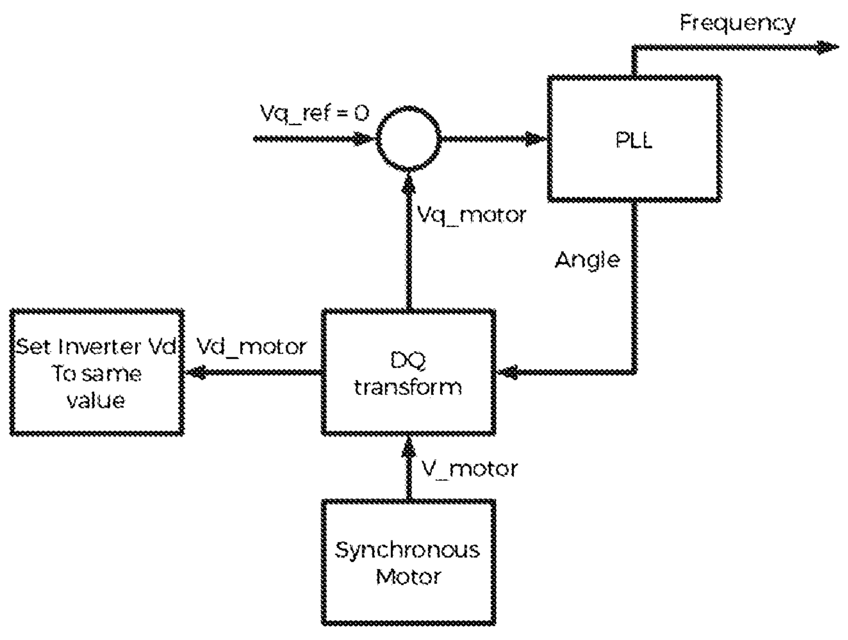
FIG. 2: Schematic data flow representation of an embodiment of a system for dynamic electric regenerative power take-off comprising an electrical detector of frequency and angle of the synchronous generator (or motor, interchangeably) with DQ transform and PLL, arranged to connect the synchronous motor when motor-fed Vd is the same of the converter connections.
Figure 4:
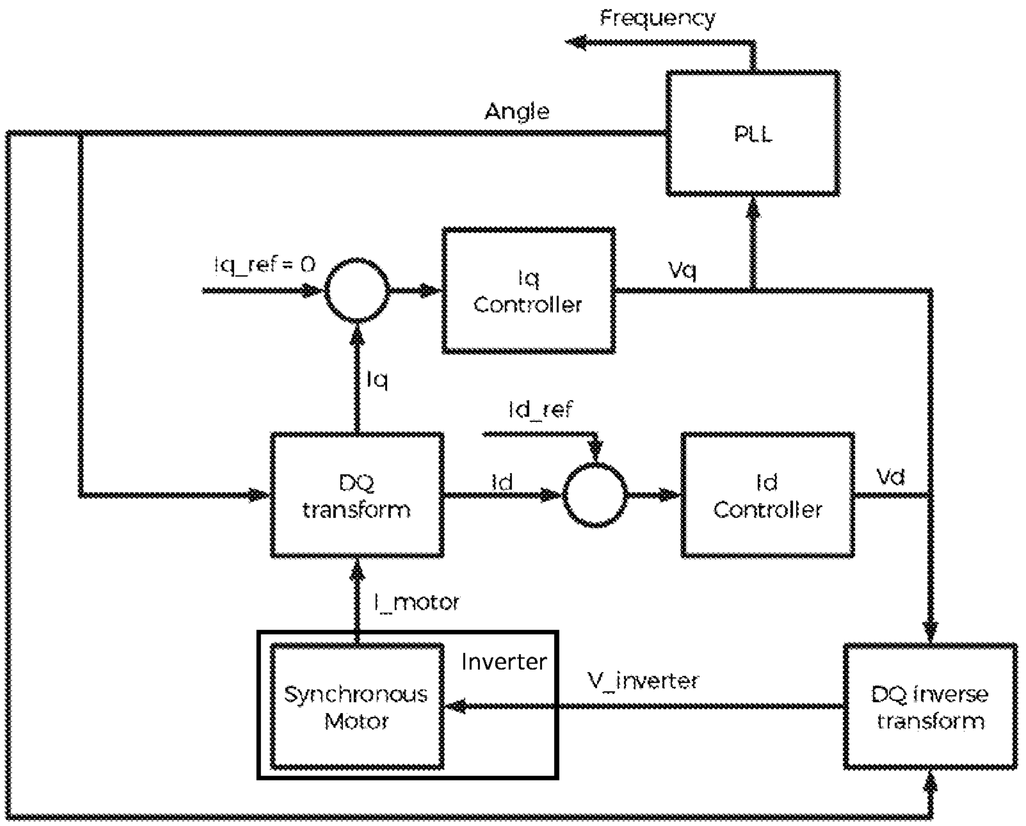
FIG. 4: Schematic data flow representation of an embodiment of a system for dynamic electric regenerative power take-off comprising an electrical detector of frequency and angle of the synchronous generator (or motor, interchangeably) with DQ transform and PLL, with the synchronous motor already connected to the converter.

In an embodiment, a DQ frame PLL used for syncing an inverter to the grid has the function of aligning the inverter's angle with the angle of the grid, so that the "q" component is near zero. In FIG. 2, the grid is replaced by a synchronous generator, which behaves exactly the same if the motor has sinusoidal output. For other motor outputs the PLL should be modified. On the other hand, a sensorless control of a motor uses the voltage from the inverter itself (Vq) to feed the PLL (see FIG. 4).

Figure 3:
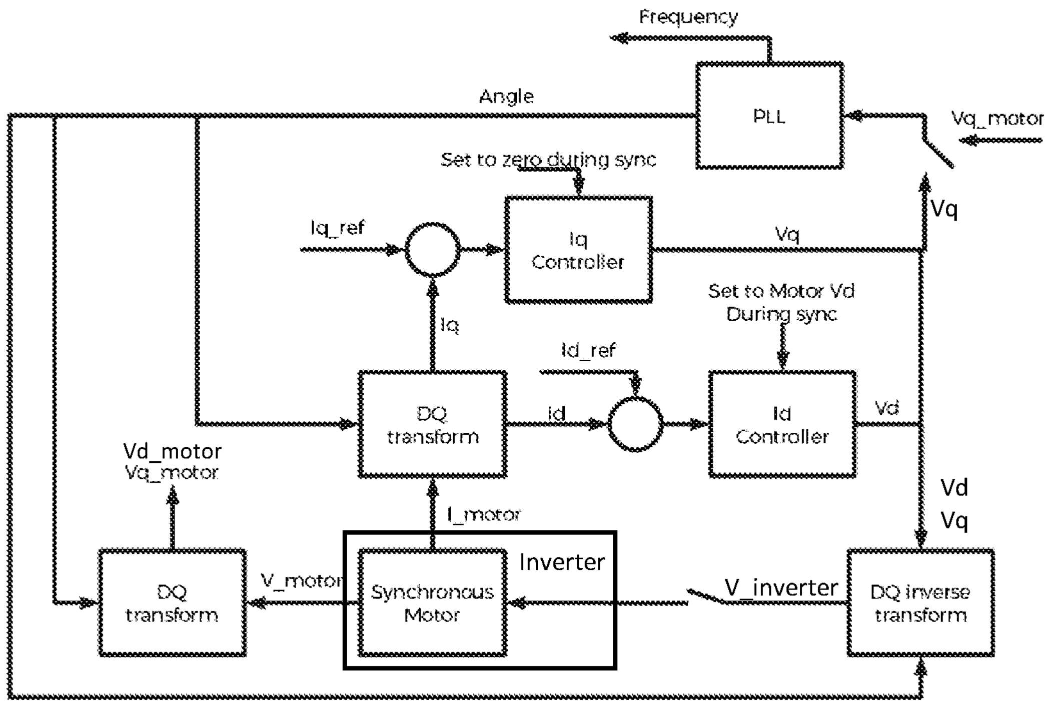
FIG. 3: Schematic data flow representation of an embodiment of a system for dynamic electric regenerative power take-off comprising an electrical detector of frequency and angle of the synchronous generator (or motor, interchangeably) with DQ transform and PLL, arranged to connect the synchronous motor when motor-fed Vd is the same of the converter connections.

In an embodiment, FIG. 3 shows that algorithm bridges both states, so that the transition is seamless.

In an embodiment, before turning on the transistors, the output/integrators of the current controllers is tampered so that the output of Iq controller equals zero and the output of Id controller equals Vd_motor.

In an embodiment, on the moment the transistors start operation, Vq is fed to the PLL instead of Vq_motor and both current controllers start operating as usual.

The term "comprising" whenever used in this document is intended to indicate the presence of stated features, integers, steps, components, but not to preclude the presence or addition of one or more other features, integers, steps, components or groups thereof.

Flow diagrams of particular embodiments of the presently disclosed methods are depicted in figures. The flow diagrams illustrate the functional information one of ordinary skill in the art requires to perform said methods required in accordance with the present disclosure.

It is to be appreciated that certain embodiments of the disclosure as described herein may be incorporated as code (e.g., a software algorithm or program) residing in firmware and/or on computer useable medium having control logic for enabling execution on a computer system having a computer processor, such as any of the servers described herein. Such a computer system typically includes memory storage configured to provide output from execution of the code which configures a processor in accordance with the execution.

The code can be arranged as firmware or software, and can be organized as a set of modules, including the various modules and algorithms described herein, such as discrete code modules, function calls, procedure calls or objects in an object-oriented programming environment. If implemented using modules, the code can comprise a single module or a plurality of modules that operate in cooperation with one another to configure the machine in which it is executed to perform the associated functions, as described herein.

The disclosure should not be seen in any way restricted to the embodiments described and a person with ordinary skill in the art will foresee many possibilities to modifications thereof. The above-described embodiments are combinable. The following claims further set out particular embodiments of the disclosure.

The invention claimed is:

1. An electronic control circuit for an electric regenerative power take-off device comprising a synchronous generator (synchronous motor), a power converter (inverter) and a power bus connecting the power converter to the generator, the circuit comprising:

- an instant voltage sensor connectable to the power bus for capturing the synchronous generator triphasic voltage (V_motor);
- an instant current sensor connectable to the power bus for capturing the synchronous generator triphasic current (I_motor);
- a voltage-based direct-quadrature ("DQ") transform calculator arranged to output an equivalent two phase DQ-D and Q, tensor (Vd_motor, Vq_motor) of three voltage vectors of the captured triphasic voltage (V_motor);
- a current-based direct-quadrature, DQ, transform calculator arranged to output an equivalent two phase DQ-D and Q, tensor (Iq, Id) of three current vectors of the captured triphasic current (I_motor);

a current-based direct-quadrature, DQ, controller (Id controller, Iq controller) configured to output setpoint active-power and reactive-power voltages (Vd, Vq) for the power converter from the outputted DQ tensor of the current-based DQ transform calculator;

a phase-locked loop ("PLL") configured to define an operation angle of the power converter and comprising a phase input;

an electronic data processor arranged to switch from a 1st operation stage to a 2nd operation stage, wherein:

the 1st stage comprises disengaging the power converter from the synchronous generator and synchronizing the PLL with the captured triphasic voltage by switching the PLL phase input to the voltage-based DQ transform calculator, and the 2nd stage comprises engaging the power converter from the synchronous generator and synchronizing the PLL with the captured triphasic voltage by switching the PLL phase input to the outputted DQ tensor output Q (Vq_motor) of the current-based DQ controller.

2. The electronic control circuit according to claim 1, wherein the electronic data processor is configured to set, during the 1st stage, an active-power setpoint voltage of the current-based DQ controller (Id Controller) equal to the outputted DQ tensor output D (Vd_motor) of the voltage-based DQ transform calculator and to set a reactive-power setpoint voltage of the current-based DQ controller (Iq Controller) equal to zero.

3. The electronic control circuit according to claim 1, further comprising a voltage-based DQ inverse transform calculator arranged to output an instant converter-driving voltage (V_inverter) from the PLL-defined operation angle, and from the setpoint active-power and reactive-power voltages (Vd, Vq) of the current-based DQ controller (Id controller, Iq controller).

4. The electronic control circuit according to claim 1, wherein the PLL is configured to output the operation angle to the current-based DQ transform calculator.

5. The electronic control circuit according to claim 1, wherein the electronic data processor is configured to change from the 1st stage to the 2nd stage when the outputted DQ tensor output Q (Vq_motor) of the voltage-based DQ transform calculator is below a predetermined threshold.

6. The electronic control circuit according to claim 1, wherein the electronic data processor is configured to engage or disengage the power converter from the synchronous generator by using power converter semiconductor switches that drive the synchronous generator voltage.

7. The electronic control circuit according to claim 1, wherein the instant voltage sensor comprises an analogue-to-digital converter.

8. The electronic control circuit according to claim 1, wherein the instant current sensor comprises an analogue-to-digital converter.

9. The electronic control circuit according to claim 1, wherein the phase-locked loop, PLL, comprises a control system configured to generate an output signal whose phase is related to the phase of an input signal.

10. The electric regenerative power take-off device according to claim 1, further comprising a synchronous generator (synchronous motor), a power converter (inverter) and a power bus connecting the power converter to the generator.

11. The electronic control circuit according to claim 10, wherein a vehicle traction shaft drives the synchronous generator.

12. A method for operating an electronic control circuit for an electric regenerative power take-off device comprising a synchronous generator (synchronous motor), a power converter (inverter) and a power bus connecting the power converter to the generator, the circuit comprising:

an instant voltage sensor connectable to the power bus configured to capture the synchronous generator triphasic voltage (V_motor);

an instant current sensor connectable to the power bus and configured to capture the synchronous generator triphasic current (I_motor);

a phase-locked loop ("PLL") to define an operation angle of the power converter and comprising a phase input;

an electronic data processor;

the method comprising, using the electronic data processor:

calculating a voltage-based direct-quadrature ("DQ") transform to output an equivalent two phase DQ-D and Q, tensor (Vd_motor, Vq_motor) from three voltage vectors of the captured triphasic voltage (V_motor);

calculating a current-based DQ transform calculator to output an equivalent two phase DQ-D and Q, tensor (Iq, Id) from three current vectors of the captured triphasic current (I_motor);

using a current-based DQ controller (Id controller, Iq controller) for outputting setpoint active-power and reactive-power voltages (Vd, Vq) for the power converter from the outputted DQ tensor of the current-based DQ transform calculator;

switching from a 1st operation stage to a 2nd operation stage, wherein:

the 1st stage comprises disengaging the power converter from the synchronous generator and synchronizing the PLL with the captured triphasic voltage by switching the PLL phase input to the voltage-based DQ transform calculator, and the 2nd stage comprises engaging the power converter from the synchronous generator and synchronizing the PLL with the captured triphasic voltage by switching the PLL phase input to the outputted DQ tensor output Q (Vq_motor) of the current-based DQ controller.

13. A non-transitory storage medium comprising computer program instructions for implementing an electronic control circuit for electric regenerative power take-off, the computer program instructions including instructions which, when executed by a processor, cause the processor to carry out the method of claim 12.

* * * * *